Figure 1:
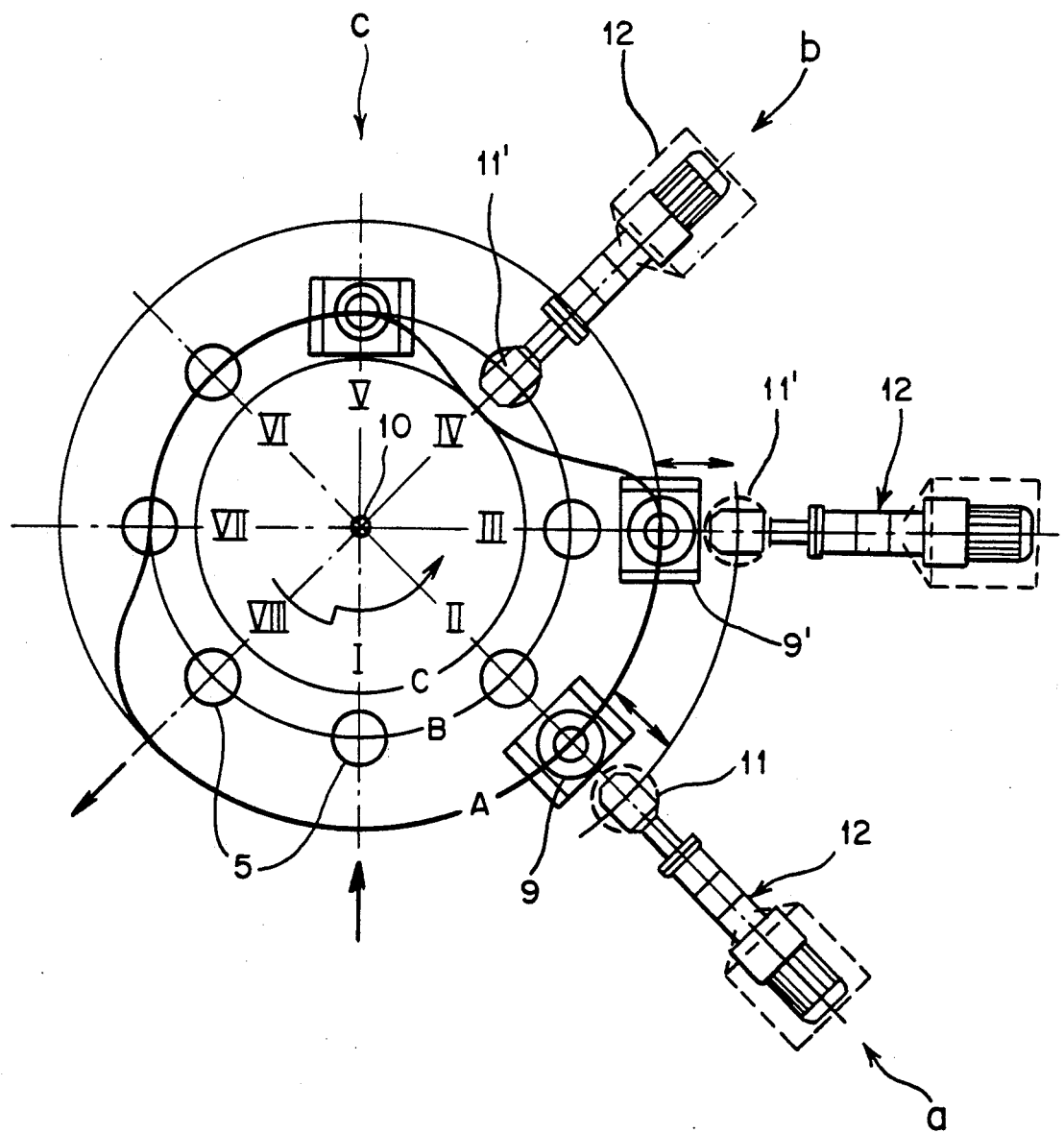

United States Patent [19]

Keller

[11] Patent Number: 5,211,798
[45] Date of Patent: May 18, 1993

[54] APPARATUS FOR THE PRODUCTION OF TUBES

[75] Inventor: Gerhard Keller, Jongny, Switzerland

[73] Assignee: AISA Automation Industrielle SA, Vouvry, Switzerland

[21] Appl. No.: 777,324

[22] PCT Filed: Mar. 26, 1991

[86] PCT No.: PCT/EP91/00581
§ 371 Date: Nov. 25, 1991
§ 102(e) Date: Nov. 25, 1991

[87] PCT Pub. No.: WO91/15349
PCT Pub. Date: Oct. 17, 1991

[30] Foreign Application Priority Data

Mar. 26, 1990 [DE] Fed. Rep. of Germany ....... 4009661

[51] Int. Cl.⁵ ............................................ B29C 47/00
[52] U.S. Cl. .................................. 156/500; 425/110; 425/126.1; 425/129.1; 425/576; 425/588
[58] Field of Search ............... 156/500, 242, 245, 556; 425/110, 126.1, 129.1, 256, 258, 451, 572, 574, 576, 588; 264/323, 325, 523

[56] References Cited

U.S. PATENT DOCUMENTS

| | | |
|---|---|---|
| 2,994,107 | 8/1961 | Quinches . |
| 3,591,896 | 7/1971 | Tartaglia . |
| 4,351,629 | 9/1982 | Farrell ..................... 425/129.1 |
| 4,419,064 | 12/1983 | Magerle ........................ 425/256 |
| 4,518,554 | 5/1985 | Hatakayama ................ 425/129.1 |
| 4,735,761 | 4/1988 | Lindenberger ................ 425/126.1 |
| 4,834,638 | 5/1989 | Miyahara et al. .............. 425/126.1 |

FOREIGN PATENT DOCUMENTS

| | | |
|---|---|---|
| 162456 | 11/1985 | European Pat. Off. . |
| 175642 | 3/1986 | European Pat. Off. . |
| 297257 | 1/1989 | European Pat. Off. . |
| 8801851 | 3/1988 | Fed. Rep. of Germany . |
| 4009661 | 3/1991 | Fed. Rep. of Germany . |
| 2596699 | 4/1986 | France . |
| 1135863 | 4/1967 | United Kingdom . |

*Primary Examiner*—Caleb Weston
*Attorney, Agent, or Firm*—Collard & Roe

[57] ABSTRACT

The invention relates to an apparatus for the production of tubes from prefinished pipe elements, by pressing cf a tube head from a heated blank (24) of a plastic, with simultaneous bonding of the latter to the tube pipe (13), with an indexed transport means which stops at several work stations (II–VII) arranged at equal distances from one another, with mandrels (7) that travel along to hold the pipe elements (13) and dies (5) arranged coaxial to the mandrels (7), which also travel along, and have central hole punches (21''), if necesary, where the mandrels (7) can be axially moved and are arranged to work together with a press (8) in such a way that they can be inserted into the dies (5) to press the tube head, as well as with a loading and unloading station (I, VIII) and with an extruder (12) and a metering device (11). According to the invention, the mandrels (7) are arranged so that in addition to the coaxial position relative to the dies (5), they can be moved into parallel positions relative to that position, where preferably the mandrels (7) can be moved to at least one inner and/or one outer additional orbit (A, C) parallel to the orbit (B) of the dies (5), located outside the transport means.

12 Claims, 5 Drawing Sheets

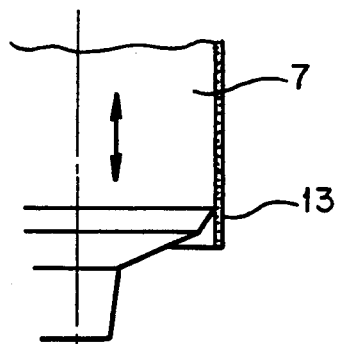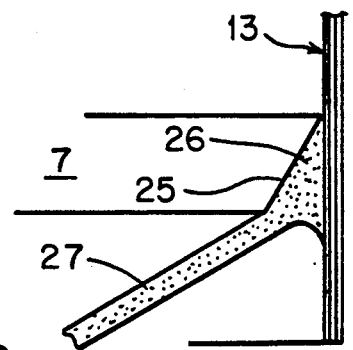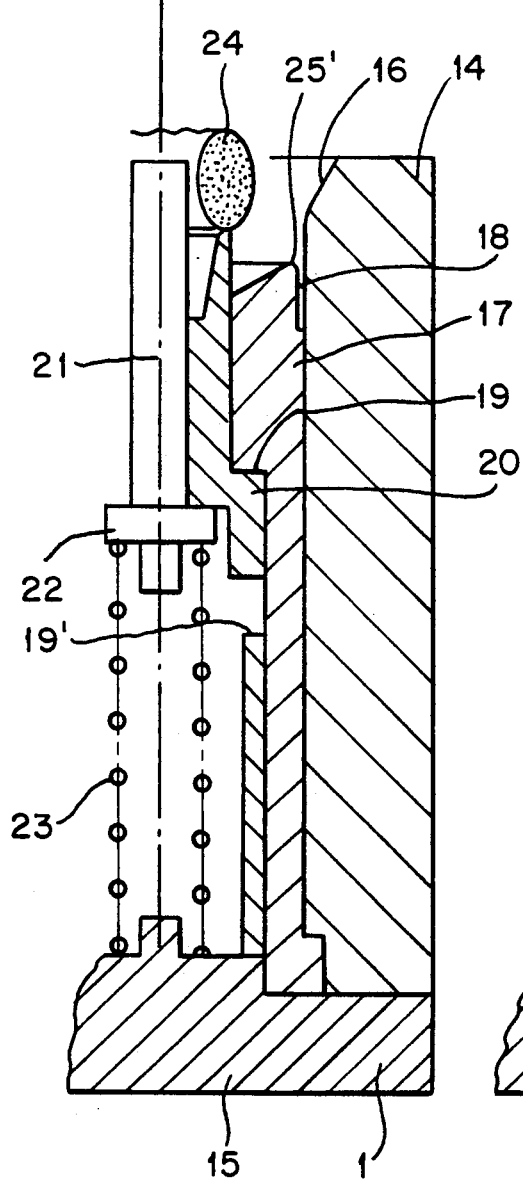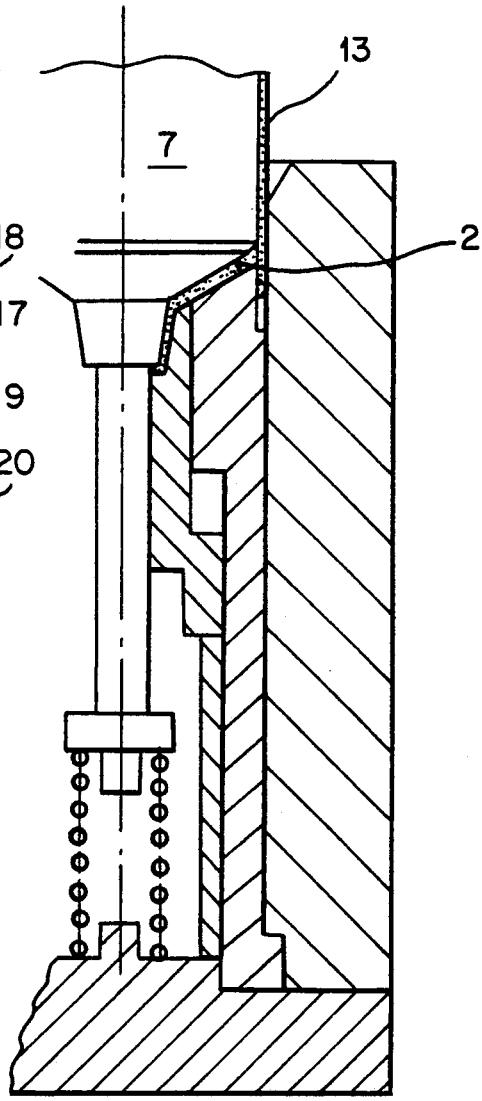
FIG. 5 FIG. 7 FIG. 6

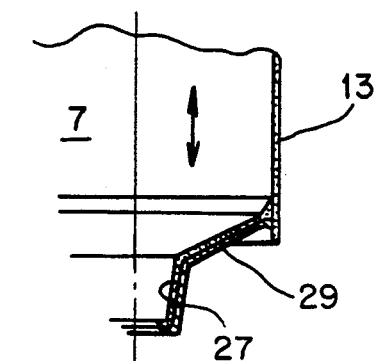
FIG. 11
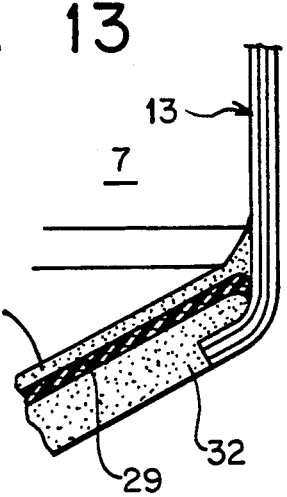
FIG. 13
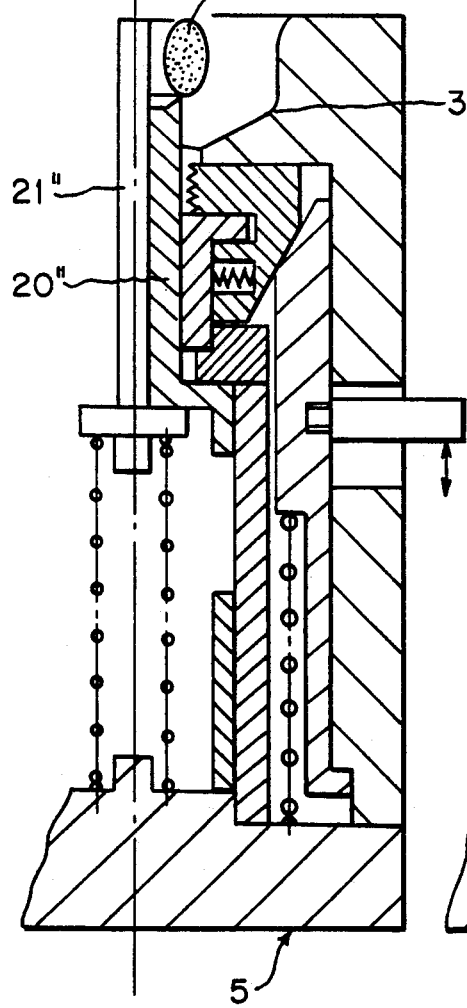
FIG. 12
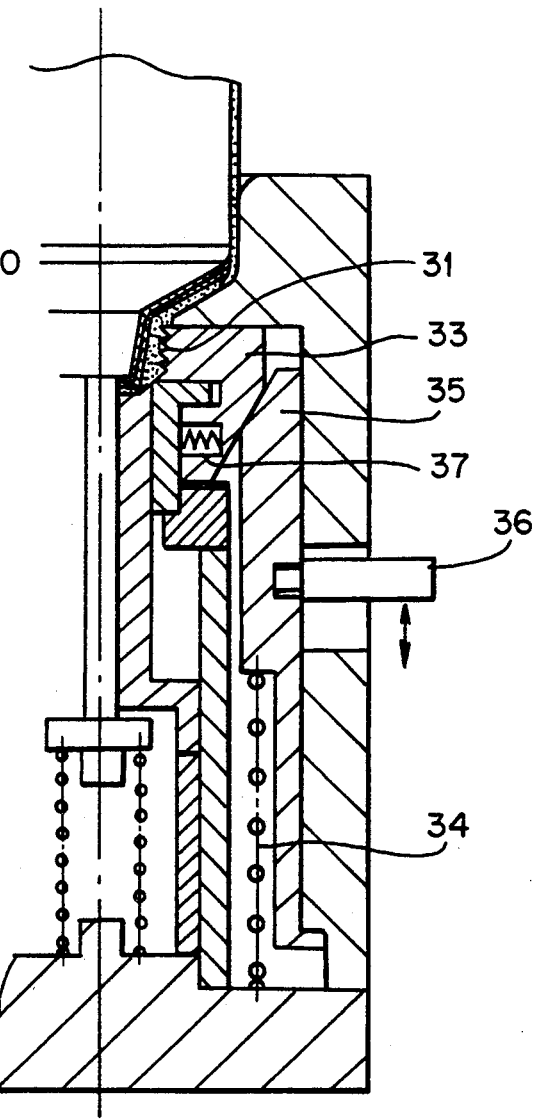

APPARATUS FOR THE PRODUCTION OF TUBES

The invention relates to an apparatus for the production of tubes made of prefinished pipe elements by pressing of a tube head from a heated plastic blank, where it is simultaneously bonded to the tube pipe, with a transport means which is indexed and stops at several work stations arranged at equal distances from one another, with mandrels that travel along to hold the pipe elements and dies arranged coaxial to the mandrels, which also travel along, and have central hole punches, if necessary, where the mandrels can be axially moved and are arranged to work together with a press punch in such a way that they can be inserted into the dies to press the tube head, as well as with a loading and unloading station and with an extruder and a metering device.

Such an apparatus is known from EP-175642-A1. In the known apparatus, both the mandrel and the die, which is arranged coaxial to it, are arranged to be movable relative to one another, on the guide of an indexing table. The pipe elements are passed into a free space between the mandrel and the die by means of a cone-shaped suction drum, and then pushed onto the mandrel. Therefore there has to be space between the mandrel and the die which must be at least somewhat greater than the length of the pipe element. Since tube elements can certainly have a sizable length, this results in large distances, which significantly increase the times for closing the press mold. Since the pressing forces also have to be transferred to the guides, these must withstand great stresses and therefore must be structured to be particularly rigid and involved. This makes the apparatus complicated and limits it with regard to cycle times, due to the large closing path. With such an apparatus, it is furthermore impossible to produce layered tube heads.

From DE-3816181-A1, a similar system for the production of prefinished pipe elements and head pieces of thermoplastic material is known, but here the mandrels can be pivoted out of the coaxial vertical position relative to the dies, into a horizontal position, for example to load and unload the mandrels, and so that it is possible to charge the dies with a blank. With this system, the stroke movements that are necessary are not as great as with the apparatus described first, but here, an additional pivot movement has to be accepted, which makes the kinematics of the apparatus complicated. Due to play and wear, the necessary precise alignment is lost very soon, so that waste is produced. In addition to the axial movement of the mandrels, the dies are also axially movable, which makes the apparatus more complicated and more susceptible to breakdown. In order to allow all these movements, the system has an extremely complicated construction.

It is the task of the invention to improve ar apparatus of the type stated initially in such a way that it allows a simple, light and compact but nevertheless stable construction, guarantees short movement strokes with avoidance of pivot movements, and makes it possible to achieve high working speeds.

Another task of the invention consists of structuring the new apparatus in such a way that it can also be used to produce tubes with a multi-layer tube head structure, with a defined, reproducible form of the individual layers of the tube head.

This task is accomplished by an apparatus with the characteristics of claim 1.

With the solution according to the invention, the mandrel can be moved out of the coaxial working position with the die, out of the range of the latter, as a result of which a material portion of a plastic is passed to the die—unhindered by the mandrel—on the one hand, and on the other hand, the mandrel is freely accessible from below, so that a pipe element can be pushed on, or a finished tube can be pulled off, without any movement around an axis of rotation being required.

The additional task is accomplished by an apparatus according to claim 1 in combination with the characteristics of claim 4.

Advantageous forms of the tube are evident from the dependent claims.

Figure 2:
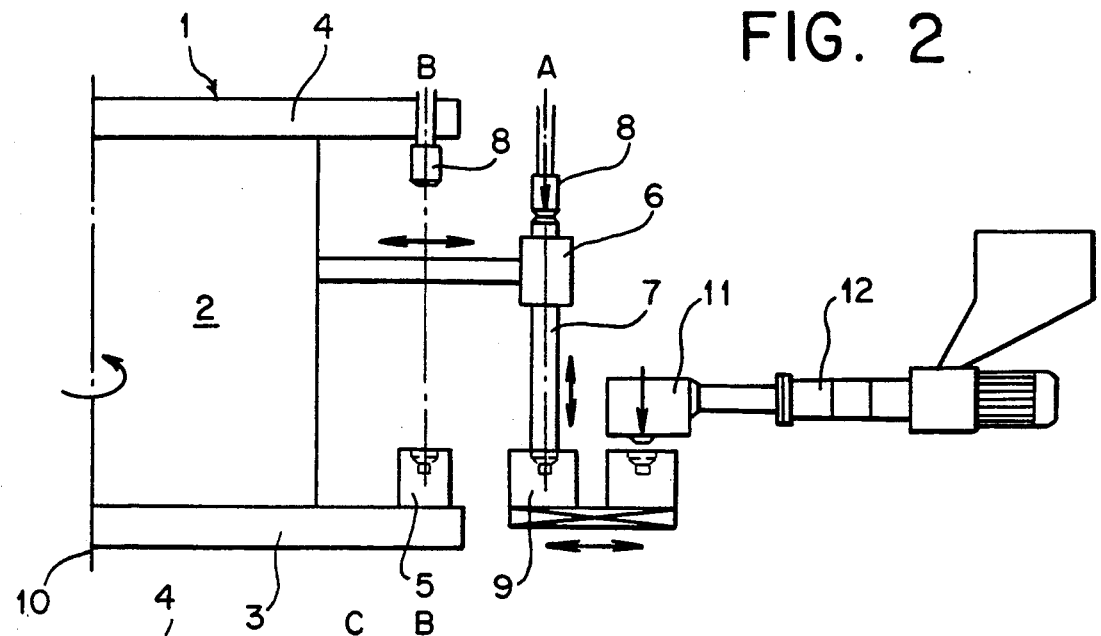
Figure 3:
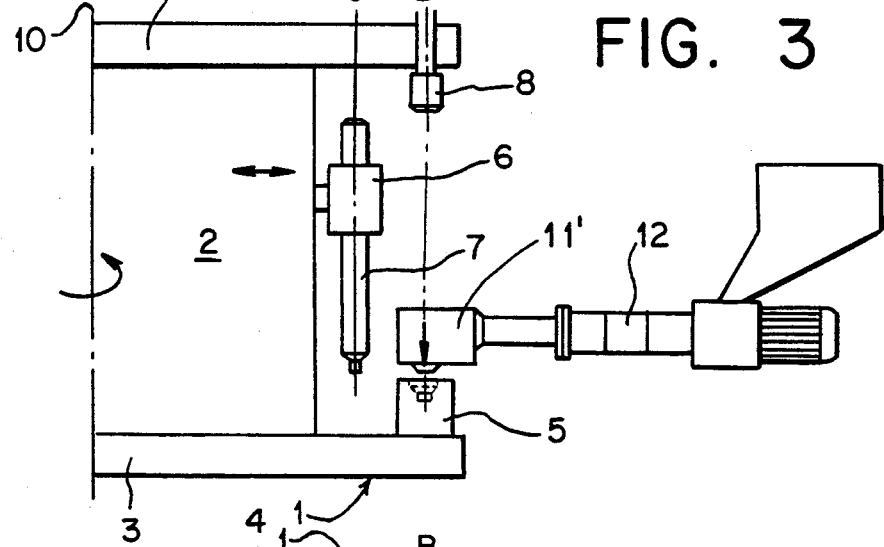
Figure 4:
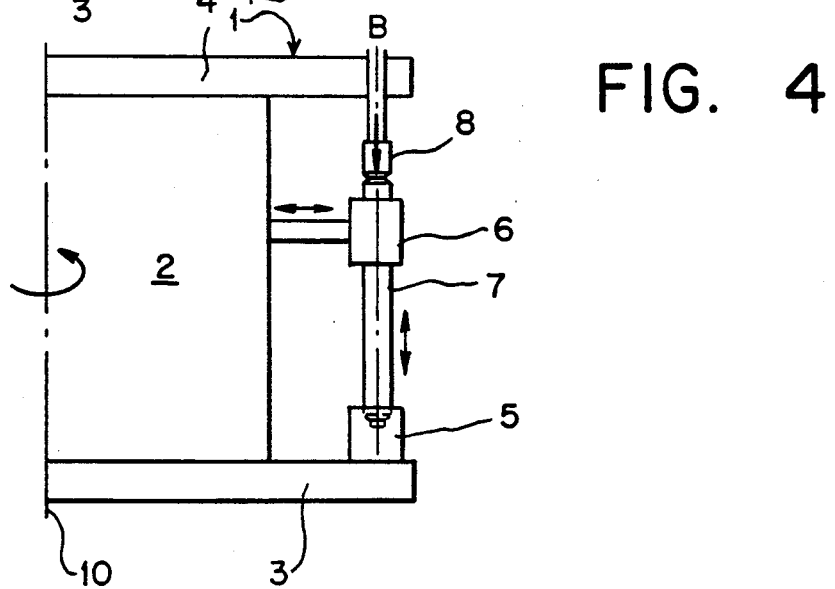
Figure 8:
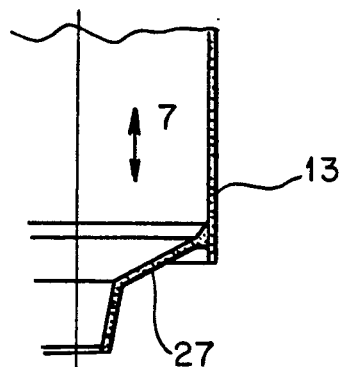
Figure 10:
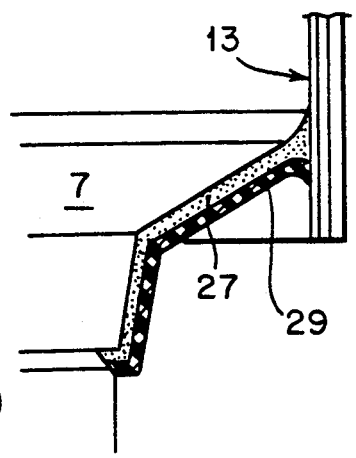
Figure 9:
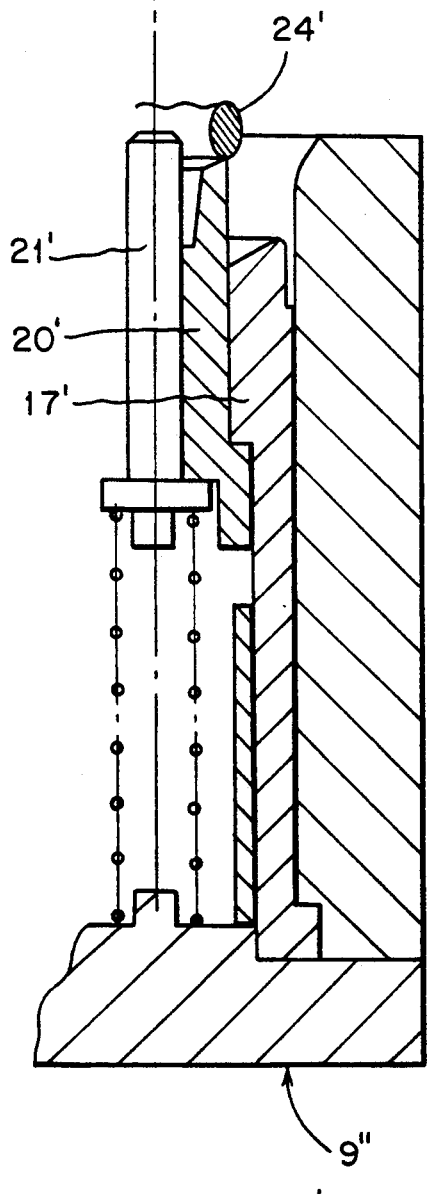
Figure 9:
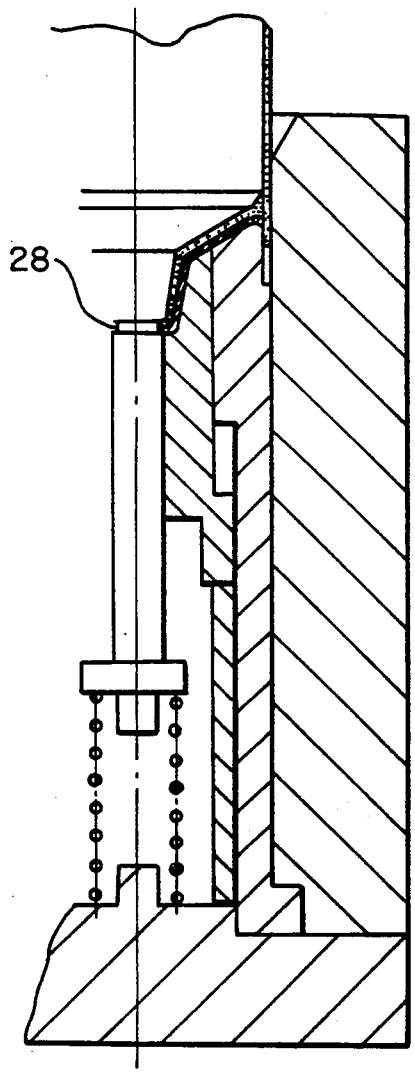

In the following, the invention will be explained in greater detail on the basis of an embodiment of an apparatus for the production of tubes made of a prefinished pipe element, with reference to drawings. These show:

FIG. 1 the working cycle of an apparatus according to the invention in a schematic representation, FIG. 2 a cross-section according to the direction of the arrow a in FIG. 1, FIG. 3 a cross-section according to the direction of the arrow b in FIG. 1, FIG. 4 a cross-section according to the direction of the arrow c in FIG. 1, FIG. 5 an additional die with assigned mandrel in the starting position for the production of the first inside layer of the tube head, FIG. 6 the same as in FIG. 5, in the pressing position, FIG. 7 an enlarged detail of the connection point of the first inner layer of the tube head with the pipe element, FIG. 8 a second additional die with assigned mandrel for the production of the second middle layer of the tube head, in the starting position, FIG. 9 the same as in FIG. 8, in the pressing position, FIG. 10 an enlarged detail of the connection point of the two-layer tube head with the pipe element, FIG. 11 a die in the indexing table with assigned mandrel for the production of a third layer for the tube head, in the starting position, FIG. 12 the same as in FIG. 11, in the pressing position, FIG. 13 a detail of the connection point of the three-layer tube head with the tube element.

An embodiment of the apparatus for the production of tubes has an indexing table I (FIG. 2 to 4). The indexing table 1 has a cylindrical drum 2 and is limited by a rigid lower plate 3 which projects out on all sides, and a rigid upper plate 4 which also projects out on all sides. In the embodiment, eight dies 5 are arranged, fixed in place and evenly distributed on the circumference of the projecting edge of the lower plate 3.

Because of the number of dies 5, eight work stations I–VIII are provided. Depending on the need and the size, more or less than eight work stations can also be provided, and it is also possible to use a different indexing transport mechanism, which can have straight-line segments as well as curved segments, instead of an indexing table.

The central axes of all the dies 5 arranged on a circle lie on a circumference path B around the central axis 10 of the indexing table 1.

Within the cylindrical drum 2, holders 6 are arranged so as to be moved radially and horizontally. At the free end of each holder 6, a vertical mandrel 7 is arranged so as to be moved axially in it. By means of its holder 6, each mandrel 7 can be moved into three defined positions, namely to an inner orbit C, to the orbit B and to an outer orbit A. If the mandrels 7 are on the inner orbit C, the access to the dies 5 is clear. If the mandrels 7 are on the outer orbit A, they project beyond the outside edge of the lower plate 3, so that they are freely accessible from below. Coaxial to each die 5, a press 8 is arranged in the upper plate 4 of the indexing table 1, so as to move axially, which serves to insert a mandrel 7 which is located on the orbit B into the die 5. Such presses 8 are known and are therefore not explained in greater detail here.

In the embodiment, however, outside the area of the indexing table 1, adjacent to it, two additional dies 9, 9' are provided. The additional dies 9, 9' can be arranged on the extension of the line which proceeds from the central axis 10 of the indexing table 1 through the central axis of a die 5 outside the indexing table on the outer orbit A. The additional dies 9, 9' are arranged to be moved in such a way that their central axes are located coaxial to a mandrel 7 which is located on the outer orbit A, in one end position. In their second end position, they are located below the dispensing nozzle of a metering device 11, which is connected with an extruder 12 for a thermoplastic material. FIG. 2 shows the additional die 9 moved into the position below the metering device 11 with broken lines.

FIG. 1 shows the work sequence of the apparatus according to the invention. In station I, the mandrel 7 is moved out to the outer orbit A, during its stop time, a prefinished pipe element 13 is pushed onto it (see FIG. 5 to 13). When the indexing table 1 is stepped, the mandrel 7 with the pipe element 13 moves along the orbit A and reaches the station II, where it is located coaxial to the additional die 9 when it has come to a stop (FIG. 5). The additional die 9 (see FIG. 5 and 6) has a hollow cylinder 14 which is closed off on the bottom by a base plate 15. The hollow cylinder 14 has a conical expansion 16 at its upper inside end, which is supposed to facilitate or ensure centered insertion of the pipe element 13 into the hollow cylinder 14 when it is lowered with the mandrel 7, even if it is not absolutely round. Within the hollow cylinder 14, a cylindrical insert 17 is arranged. At the upper end, a ring gap 18 is provided between the hollow cylinder 14 and the insert 17, which is supposed to hold the end of the pipe element 13 which projects beyond the mandrel 7. In order to facilitate insertion of the pipe element 13 into the ring gap 18, the edge of the insert 17 which delimits the ring gap 18 is provided with a rounded part 25', which results in a further advantage which will be indicated below. Concentric to the hollow cylinder 14 and to the insert 17, an intermediate carrier 20 is arranged to move axially between two stops 19, 19' in the insert 17. Centrally in the intermediate carrier 20, a hole punch 21 is arranged to move axially in it. The hole punch 21 has a ring-shaped projection 22 at its bottom end, which can enter into contact with a ring-shaped bottom surface of the intermediate carrier 20 (see the position in FIG. 5). Between the projection 22 and the bottom plate 15, a spring 23 is arranged, tensed, which holds the hole punch 21 and therefore also the intermediate carrier 20 in their upper end positions (FIG. 5).

From the metering device 11, a ring-shaped blank 24 (FIG. 5) was passed to the position of the additional die 9 shown with a broken line in FIG. 2, and deposited on the intermediate carrier 20, where the blank 24 is centered by the hole punch 21.

As soon as the mandrel 7 in the station II is in a coaxial position relative to the additional die 9 with the blank 24 on the orbit A, which is displaced in this position (see FIG. 5), a press is activated, which lowers the mandrel 7 into the additional die 9. The free end of this mandrel 7 is shaped in such a way that it corresponds to the inside shape of a desired tube head to be produced. The projection of the mandrel 7 which forms the neck part comes into contact with the hole punch 21 during its downward movement and moves it downward against the force of the spring 23. As the downward movement progresses, the intermediate carrier 20 is also lowered until it touches against the bottom stop 19, In this position (see FIG. 6), the blank 24 is pressed to form a first layer 27 of the tube head to be produced, with a widened foot 26 being formed due to a bevel 25 (FIG. 7) of the mandrel 7 and the rounded part 25' at the upper end of the insert 17, which foot ensures secure and firm adhesion at the pipe element 13. Because of the structure of the free surfaces of the intermediate carrier 20 and the insert 17 directed towards the mandrel 7, the shape and the thickness of the first inside layer 27 of the tube head to be produced is determined in interaction with the shape of the mandrel 7. By replacing the intermediate carrier 20 and the insert 17, the shape of the layer to be produced in each instance can be changed in simple manner.

After a time which is sufficient to achieve shape stability of the first layer 27, the mandrel 7 is brought back to its starting position by the press or another drive (not shown), and the indexing table 1 cycles one cycle further, so that the mandrel 7 with the pipe element 13 and the first layer 27 gets to the station III. In the station III, another additional die 9, is arranged, where its structure and the sequence of functions is similar to that described above. However, the hole punch 21' of the die 9, has a greater diameter than the hole punch 21 of the die 9 in the station II. It also has a conically pointed truncated cone end 28, or also a stepped end (not shown), which takes into consideration that the first layer 27 has a smaller dispensing opening due to the hole punch 21 with a smaller diameter. The end 28 is structured in such a way that it just fits into the dispensing opening of the first layer 27, so that the dispensing opening of the first layer 27 is protected against penetration of plastic material of the second layer 29. The surfaces of the intermediate carrier 20, and the insert 17, are structured in such a way that there is still some clear press space to produce the second layer 29 between the mandrel 7 with the first layer 27 in its bottom end position. Because of the enlargement of the diameter of the hole punch 21', the second layer 29 has a larger central opening, i.e. the first layer 27 projects slightly beyond the second layer 29 according to FIG. 10.

After expiration of the pressing time required for shape stability, the mandrel 7, now with the two layers 27, 29 is moved back to the starting position, where the holder 6 of the mandrel 7 is moved in during the next step of the indexing table 1 so that its mandrel 7 is located in the inner orbit C at the next station IV. At the station IV, a metering device 11" of an extruder 12 is arranged, in stationary manner, above the die 5 of the indexing table 1 which is in the station IV at any particular time, in the embodiment. The dies 5 in the indexing table 1 are shown in FIG. 11 and 12 and correspond to the additional dies 9, 9' in their essential parts. However, the dies 5 no longer have a ring gap 18, but rather a rounded part 30, which serves to bend or curve the free end of the pipe element 13 towards the inside, as is particularly clearly evident, in the end result, from FIG. 13. The die 5 has a mold part which serves to shape the outside thread 31 on the tube neck during the production of the third layer 32 of the tube head. For this, the die 5 has at least two radially adjustable threaded cheeks (33) as compared with the additional dies 9 (FIG. 12). The threaded cheeks 33 are held in the closed position by a spring 34, by means of a sleeve 35 which can be moved axially. Preferably, the sleeve 35 and the threaded cheeks have conical slide surfaces. The sleeve 35 is connected with a bolt 36 which comes out of the die 5 in a long hole. By means of a mechanism which is not shown, the sleeve 35 can be moved axially downward against the force of the spring 34, by means of the bolt 36, which causes the threaded cheeks to be released and to move radially outward due to the pre-tensed springs 37, and thus to release the thread 31 produced. In station IV (see FIG. 3) a blank 24 is merely placed on the intermediate carrier 20" of the die 5. During the next step, this charged die 5 is passed to the station V (see FIG. 4 and 11), during which process the mandrel 7 is guided from the orbit C to the orbit B. In this position, lowering of the mandrel 7 by the press 8 to form the third outer layer 32, with which the outside contour of the tube head with the uniform transition to the bent end of the pipe element is formed, takes place. The hole punch 21" of the die 5 demonstrates the smallest diameter, so that material of the third layer can penetrate at the side of the hole punch 21" up to the mandrel 7 and thus can cover both the dispensing openings and the second as well as the first layer. The third layer 32, which also has the thread 31, is generally made somewhat thicker, so that the station VI or, if necessary, also station VII can be provided as a cooling station. During indexing from station VII to station VIII, the mandrel 7 is brought back from the center orbit B to the cuter orbit A, so that the finished tube can be unloaded from it outside the indexing table 1, at the station VIII.

As a variation of the apparatus according to the invention, this can have merely two orbits, if loading and unloading take place through the indexing table, for example, and only one layer is to be provided for the tube head. A corresponding situation applies if instead of a stationary metering device, a movable metering device is used, which can be brought into a position above the fixed dies. It is also possible to bring the mandrels to the outer orbit B not after the station VII, but already before it, so that a cap can be screwed on at station VII, for example. The apparatus also permits the production of tube heads with more or fewer than three layers (using more additional dies) and can therefore be used in many different ways.

The three-layer construction according to the embodiment has the advantage that a so-called barrier layer can be provided as the middle layer, which often is not supposed to come into contact with the contents of the tube, in other words must be covered, which is possible, in simple manner, by means of the various hole punch diameters as described above. By means of the rounded part 5, at the projecting end of the inset 17 and the bevel 25 at the mandrel 7, a material widening as a foot 26 occurs, which also has the effect that the edge of the second layer 29 can be structured bent at approximately a right angle relative to the pipe element 13 (see FIG. 10 and 13).

The dies 5 and the additional dies 9, 9' can also be structured differently, and all that is necessary is that all additional dies 9, 9' have a ring gap 18. For example, the intermediate carrier 20 can be eliminated in all dies, and the hole punch 21 can also be eliminated in all but one die, the latter if one or more layers are supposed to seal the dispensing opening as a membrane.

To drive the indexing table 1 and to control the mandrel movements as well as the movements of the press 8, any known drives and controls, e.g. cam controls can be used, so that these do not have to be explained in more detail here. FIG. 2 shows a cross-section as it corresponds to the situation at the stations II and III, FIG. 3 shows it for the station IV, and FIG. 4 shows it for the situation at the stations V, VI and VII according to FIG. 1.

The apparatus according to the invention demonstrates a simple structure, can be varied in many different ways, and thus can be easily adapted to different process sequences and tube structures, especially with regard to the tube head, where the mandrels perform only short linear inherent movements, so that high working speeds are possible.

In order not to complicate the representation, individual mandrels are shown at the stations of the indexing table, with the corresponding individual dies and punches assigned to them. To increase the yield per time element, however, two, three or more mandrels could also be provided, with a corresponding number of punches and dies assigned to them, in such a way that two, three or more units are processed at each station.

I claim:

1. Apparatus for the production of tubes from prefinished pipe elements, by pressing of a tube head from a heated blank of a plastic, with simultaneous bonding of the heated blank to a tube pipe element comprising:
   an indexed transport means which stops at several work stations arranged at equal distances from one another, said work stations including a loading station and an unloading station;
   mandrels that travel along to hold the pipe elements;
   dies arranged coaxial to the mandrels which also travel along, and have central hole punches;
   said mandrels can be axially moved and are arranged to work together with a press in such a way that said mandrels can be inserted into the dies to press the tube head;
   an extruder for said plastic blank adjacent to a work station and a metering device for supplying plastic to said extruder;
   said mandrels are arranged so that each mandrel is locatable in a coaxial position orbit relative to the dies; and
   means for moving each mandrel into parallel position orbits relative to that coaxial position orbit.

2. Apparatus according to claim 1, comprising means for moving each mandrel from the coaxial position orbit to at least one inner orbit and at least one outer orbit parallel to the coaxial orbit of the dies, located outside the transport means.

3. Apparatus according to claim 2, wherein said loading station and said unloading station are each located at the outer orbit of the mandrels.

4. Apparatus according to claim 2 for the production of tubes with a tube head of at least two layers, further comprising at least one additional die assigned to the mandrels on the outer orbit.

5. Apparatus according to claim 4, further comprising a work sequence and a last die, and wherein the central hole punch of the last die in the work sequence has a lesser diameter than all the other central hole punches which belong to the dies arranged before it in the work sequence.

6. Apparatus according to claim 4, wherein the dies themselves are attached to the transport means so as not to move.

7. Apparatus according to claim 6, further comprising means for moving said at least one additional die away from the outer orbit of the mandrels; and an additional extruder adjacent to a work station having a metering device.

8. Apparatus according to claim 7, wherein said additional die has a ring gap to hold an end of the pipe element.

9. Apparatus according to claim 8, wherein the ring gap has an inner top edge which has a rounded part.

10. Apparatus according to claim 8, wherein the ring gap has an outer top edge which as a conical expansion.

11. Apparatus according to claim 8, wherein each die has an axially movable intermediate carrier in which the central hole punch is axially movable centrally, and is arranged with spring support.

12. Apparatus according to claim 11, further comprising stops for limiting the axial movement of the intermediate carrier.

* * * * *